J. H. McCOY.
SILO.
APPLICATION FILED FEB. 15, 1909.

942,340.

Patented Dec. 7, 1909.

Witnesses:
Chas. S. Ripley
Henry Sens

Inventor:
John H. McCoy
by C. M. Clarke
his attorney

UNITED STATES PATENT OFFICE.

JOHN HUGH McCOY, OF HARRISVILLE, PENNSYLVANIA.

SILO.

942,340.　　　　　Specification of Letters Patent.　　Patented Dec. 7, 1909.

Application filed February 15, 1909. Serial No. 478,091.

*To all whom it may concern:*

Be it known that I, JOHN H. McCOY, a citizen of the United States, residing at Harrisville, in the county of Butler and State of Pennsylvania, have invented certain new and useful Improvements in Silos, of which the following is a specification, reference being had therein to the accompanying drawing.

My invention relates to improvements in silos and particularly a silo or other similar construction, of concrete.

It has for its object to provide a continuous, cylindrical vertical structure having for a portion of its height between its base and top, a continuous discharging opening, with transverse connecting elements located at any desired intervals, constructed in the manner hereinafter more fully described.

Figure 1:
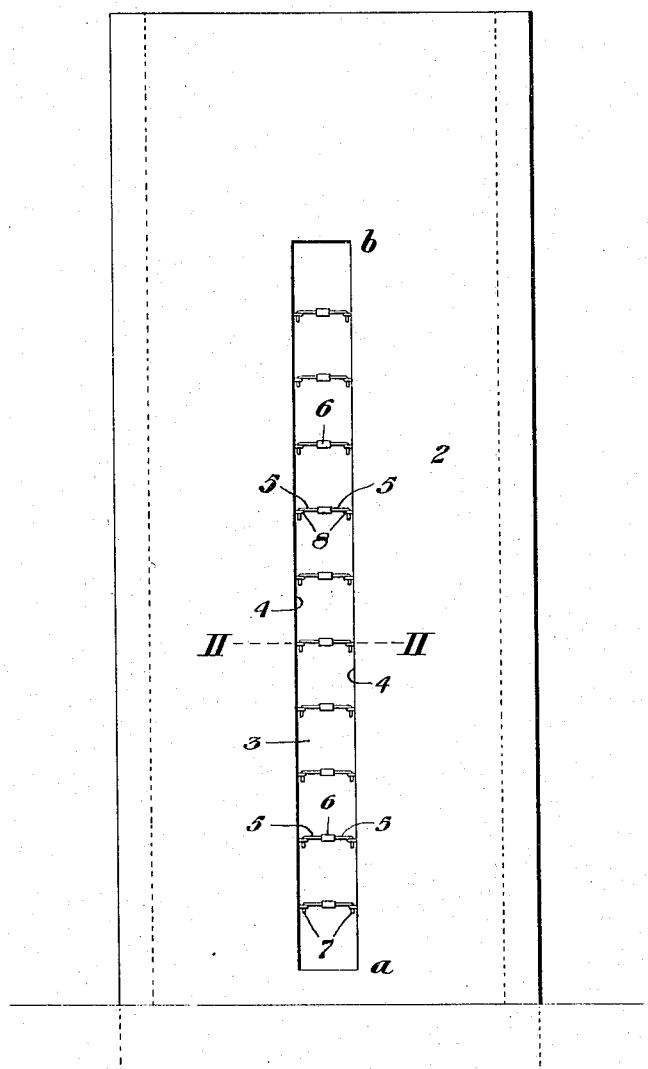
Figure 2:
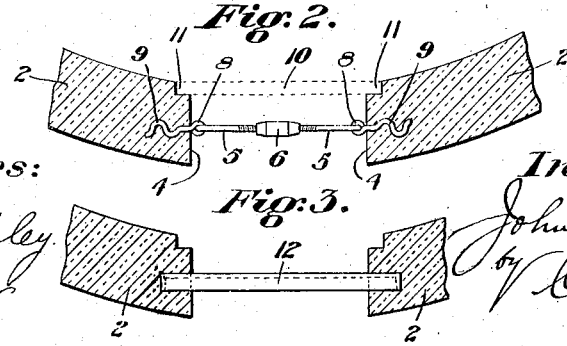
Figure 3:

In the accompanying drawings:—Figure 1 is a view in front elevation of a complete silo made in accordance with my invention. Fig. 2 is an enlarged cross sectional view taken on the line II. II. of Fig. 1. Fig. 3 is a similar view showing a modified construction.

The silo consists of a cylindrical vertical body portion 2 of any desired height and external and internal diameter, the wall thereof being built up in a manner suitable for this class of structure, within any suitable molding apparatus, sectionally, so as to provide smooth interior and exterior surfaces.

The base of the silo rests upon any suitable foundation structure and the complete uninterrupted cylindrical base portion preferably extends slightly above the ground line, as shown. From such desired distance above the ground line or above the foundation, as *a*, to any suitable or desired height, as *b*, I provide a continuous vertical slot-like opening 3 extending through the wall from the interior to the exterior, for the purpose of discharging the contents outwardly to a chute or conduit or otherwise, as used. At intervals the opposite edges 4, 4, forming the boundary of opening 3, are connected by any suitable device for the purpose of insuring stability and maintaining the walls rigid against the internal pressure or other strains. In the principal figures of the drawings, these connecting devices are shown as rods or bars 5, 5, threaded at their inner ends with right and left hand threads respectively, and are connected by a turn-buckle 6. The outer ends of the rods 5 are provided with terminal hooks 7 adapted to engage eyes 8, 8, embedded within the body portion of the wall by anchoring bolts or extensions 9 of any suitable form, to insure their holding engagement therewith. By this construction, the edges of the walls are joined at intervals and any desired tension may be maintained, while as the contents are discharged through the opening 3 and the level of the contents is lowered, the connections may be loosened and removed to provide head room. They may be as easily replaced above after removal if desired, or the upper open cavity of the space may be left un-connected until the silo is again ready to be re-filled.

It will be understood that the inner wall of the silo may be continued across the opening by removable slats or boards 10, indicated in dotted lines in Fig. 2, set within suitable rabbets 11 in the wall edges, or the space may be closed in any other suitable manner.

In Fig. 3, I have shown the edges of the wall as connected by permanent cross elements, as angles or bars 12, which may be permanently set within the concrete walls and held therein by deflected or bent terminals, as will be readily understood. In such construction the connections are preferably spaced somewhat more widely apart, thereby providing for ample permanent head room and obviating the necessity of their removal.

With either construction, the stability of the structure will be constantly maintained; its efficiency and convenience for use is greatly increased; the installation of the connections during process of manufacture is rendered simple and economical, and the construction as a whole will be found to provide for efficient, continuous use and avoids the necessity of the employment of any other exterior bracing elements.

It will be understood that the design, proportions, or various details of the invention may be changed or varied by the skilled mechanic; the silo may be provided with one or more vertical openings as desired, and may be otherwise changed within the province of the skilled mechanic, but all such changes are to be considered as within the scope of the following claims:

What I claim is:—

1. A concrete structure consisting of a cylindrical vertical shell having a vertical opening therein and provided with a series of removable connecting elements extending across the opening at intervals and secured to holding devices set in the edges of the wall, substantially as set forth.

2. A concrete structure consisting of a cylindrical vertical shell having a vertical opening therein and provided with a series of adjustable and removable connecting elements extending across the opening at intervals and secured to holding devices set in the edges of the wall, substantially as set forth.

3. In a silo, the combination with a cylindrical wall of concrete having a vertical discharge opening, of a series of anchoring eyes having their shanks set into opposing edges of said wall at each side of the opening, and corresponding series of removable tension elements connected therewith, substantially as set forth.

4. A silo provided with a vertical discharge opening and series of connecting elements set in each opposing edge of the wall, and connecting rods having intermediate adjusting turn-buckles, and outer terminal hooks inserted in said elements, substantially as set forth.

5. In a silo, the combination with a cylindrical wall of concrete having a vertical discharge opening, of a series of anchoring eyes having their shanks set into opposing edges of said wall at each side of the opening, and corresponding series of removable connecting rods having intermediate adjusting turn-buckles, and terminal hooks for engagement with said eyes, substantially as set forth.

In testimony whereof I affix my signature in presence of two witnesses.

JOHN HUGH McCOY.

Witnesses:
W. A. BONE,
L. O. McDONNELL.